(12) United States Patent
Smith et al.

(10) Patent No.: US 6,989,173 B2
(45) Date of Patent: Jan. 24, 2006

(54) PATCHING RESINS FOR INSULATING TAPES

(75) Inventors: James D. B. Smith, Monroeville, PA (US); F. Tim Emery, Fort Payne, AL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 90 days.

(21) Appl. No.: 10/661,689

(22) Filed: Sep. 12, 2003

(65) Prior Publication Data

US 2005/0058772 A1 Mar. 17, 2005

(51) Int. Cl.
 B32B 35/00 (2006.01)
 B05D 3/02 (2006.01)
 B05D 3/00 (2006.01)

(52) U.S. Cl. .............. 427/140; 427/372.2; 427/383.1; 427/383.3

(58) Field of Classification Search .............. 427/140, 427/372.2, 383.1, 383.3, 58, 126.1
 See application file for complete search history.

(56) References Cited

U.S. PATENT DOCUMENTS

| | | | | |
|---|---|---|---|---|
| 4,224,541 A | * | 9/1980 | Smith et al. | 310/45 |
| 6,238,790 B1 | * | 5/2001 | Smith et al. | 428/379 |
| 2003/0074790 A1 | * | 4/2003 | Ito et al. | 29/852 |

* cited by examiner

Primary Examiner—Timothy Meeks
Assistant Examiner—Eric B. Fuller

(57) ABSTRACT

The present invention comprises a polymeric epoxy patching resin containing metal intercalated AlSiO structures. The AlSiO structures are typically nanoclays, and the preferred metals are Cr, Sn and Zn, and mixtures thereof. The patching resin is applied to damaged mica tapes, where the metal intercalated nanoclays penetrate the damaged area, leaving a homogenous patch. The present invention may also be used to thicken an area of insulating tape.

23 Claims, 3 Drawing Sheets

PATCHING RESINS FOR INSULATING TAPES

BACKGROUND OF THE INVENTION

There is a continuous need in any industry that uses electrical appliances to properly insulate conductors. A favored type of insulation material is a mica-tape. This mica-tape may be wound around conductors to provide extremely good electrical insulation. An example of this is shown in FIG. 1. Illustrated here is a coil 13, comprising a plurality of turns of conductors 14. Each turn of the conductor 14 consists essentially of a copper bar or wire wrapped with a turn insulation 15. The turn insulation 15 is prepared preferably from a fibrous sheet or strip which may impregnated with a resin. Ground insulation for the coil is provided by wrapping one or more layers of composite mica tape 16 about the turn 14. The turn insulation is not adequate to withstand the severe voltage gradients that will be present between the conductor and ground when the coil is installed in a high-voltage generator. Therefore, ground insulation for the coil is provided by wrapping one or more layers of mica tape 16 about the turn 14. Such composite tape may be a paper or felt of laid down small mica flakes or may comprise a pliable backing sheet 18 of, for example, glass fiber cloth or polyethylene glycol terephthalate mat, having a layer of mica, usually in the form of flakes 20, bonded thereto by a liquid resinous binder. The tape may be applied half lapped, abutted or otherwise. Generally, a plurality of layers of the composite tape 16 are wrapped about the coil depending upon voltage requirements. To impart better abrasion resistance and to secure a tighter insulation, a wrapping of an outer tape 21 of a tough fibrous material, for example, glass fiber, or the like is applied to the coil.

Such a mica-tape 16 comprises a pliable backing sheet 18 of, for example, poly-ethylene glycol terephthalate or glass fabric mat, having a layer of mica flakes 20 bonded thereto the alumoxane-LCT-epoxy resin of the present invention. The tape 16 may be applied half lapped, abutted or in any other suitable manner. Generally, multiple layers of the mica tape 16 are wrapped about the coil with sixteen or more layers generally being used for high voltage coils. The number of layers may be decreased depending on the power of the generator and the effectiveness of the insulator in both its abilities to insulate electrically and conduct heat. To impart better abrasion resistance and to secure a tighter insulation, a wrapping of an outer tape 21 of a tough fibrous material, for example, glass fiber, asbestos or the like may be applied to the coil. Other types of mica-tapes will be apparent to one of ordinary skill in the art.

Mica, a group of silicates, such as $KAl_2 AlSi_3 O_{10} (OH)_2$ (Muscovite) or $KMg_3 AlSi_3 O_{10} (OH)_2$ (phlogopite), has long been a key component of high voltage electrical insulation in electrical machines over 7 kv, because of its particularly high dielectric strength, low dielectric loss, high resistivity, excellent thermal stability and excellent corona resistance. Presently, mica is used in the form of flakes on a glass fabric backing, which provides mechanical integrity required for machine wrapping of coils, as shown for example in U.S. Pat. Nos. 4,112,183 and 4,254,351 (Smith and Smith et al.), respectively. In many cases, mica tape is wrapped around the coil and then impregnated with low viscosity liquid insulation resin by vacuum-pressure impregnation ("VPI"). That process consists of evacuating a chamber containing the coil in order to remove air and moisture trapped in the mica tape, then introducing the insulation resin under pressure to impregnate the mica tape completely with resin thus eliminating voids, producing resinous insulation in a mica matrix. This resin is subsequently cured by a prolonged heating cycle.

Problems, however, arise when the mica-tape becomes damaged through tears or dents. When the tape is damaged the dielectric strength in that area is lost or reduced. Even an area of minor damage will allow for a discharge of electricity, which will cause further breakdown in the insulation in and around that damaged point. FIG. 2 illustrates a cross sectional view of a damaged area on a mica-tape insulator. This simplified view shows a layer of mica-tape 16 atop a conductor 14. The mica-tape is shown as layers of mica 24 interspersed with glass fibers 26. At the point of damage 28, the mica layers and glass fibers are disrupted. Lesser damage, such as a dent, might result in the compacting of layers with only minimal amounts of fraying, while more serious damage, as shown here, may result in a complete cut through the entire tape.

Typically, when the mica-tape becomes damaged it needs to be replaced. This involves a time-intensive and costly replacement of the entire mica-tape on that conductor. Because the replacement of the entire mica-tape is such an onerous task, efforts have been made to come up with a way of fixing the tape rather than replacing it.

One such method includes applying a patching resin to the damaged area. This resin is typically the same types of resin used to originally impregnate the mica-tape, as discussed above. The patching resin contains mica particles, and when cured the effort is for the resin patch to mimic the mica-tape structure. FIG. 3 shows a example of a repaired area using a patching resin. The cured resin 30 containing the mica particles 32 fills in the damaged area on the mica-tape 16. Although the resin itself penetrates between the damaged layers, the mica particles do not due to their size. This essentially creates a heterogeneous patch, where there is a physical interface between the mica of the mica-tape and the mica of the patching resin. This creates a weak spot at the edges of the patched area 33 that has a reduced dielectric strength and will discharge electricity. This electrical discharge will then cause further breakdown of the mica-tape and patch.

Therefore the patching resin has limited and often only temporary benefit in repairing damaged mica-tape, and often the mica-tape still needs to be replaced. What is needed is an improved patching resin that will provide sufficient dielectric strength to the repaired area and not allow for any weak spots.

SUMMARY OF THE INVENTION

In one embodiment, the present invention comprises a polymeric epoxy patching resin containing metal intercalated AlSiO structures. The AlSiO structures are typically nanoclays, and the preferred metals are Cr, Sn and Zn, and mixtures thereof. The patching resin is applied to damaged mica tapes, where the metal intercalated nanoclays penetrate the damaged area, leaving a homogenous patch. The present invention may also be used to thicken an area of insulating tape.

In one embodiment the ratio of metal intercalated AlSiO structures to resin is about 3–25% wt.

In another embodiment the patching resin is cured locally at temperatures between 60–120° C.

In another embodiment the resin comprises a reactive diluent.

In still another embodiment the present invention is used to thicken insulating tapes.

DETAILED DESCRIPTION OF THE INVENTION

Figure 1:
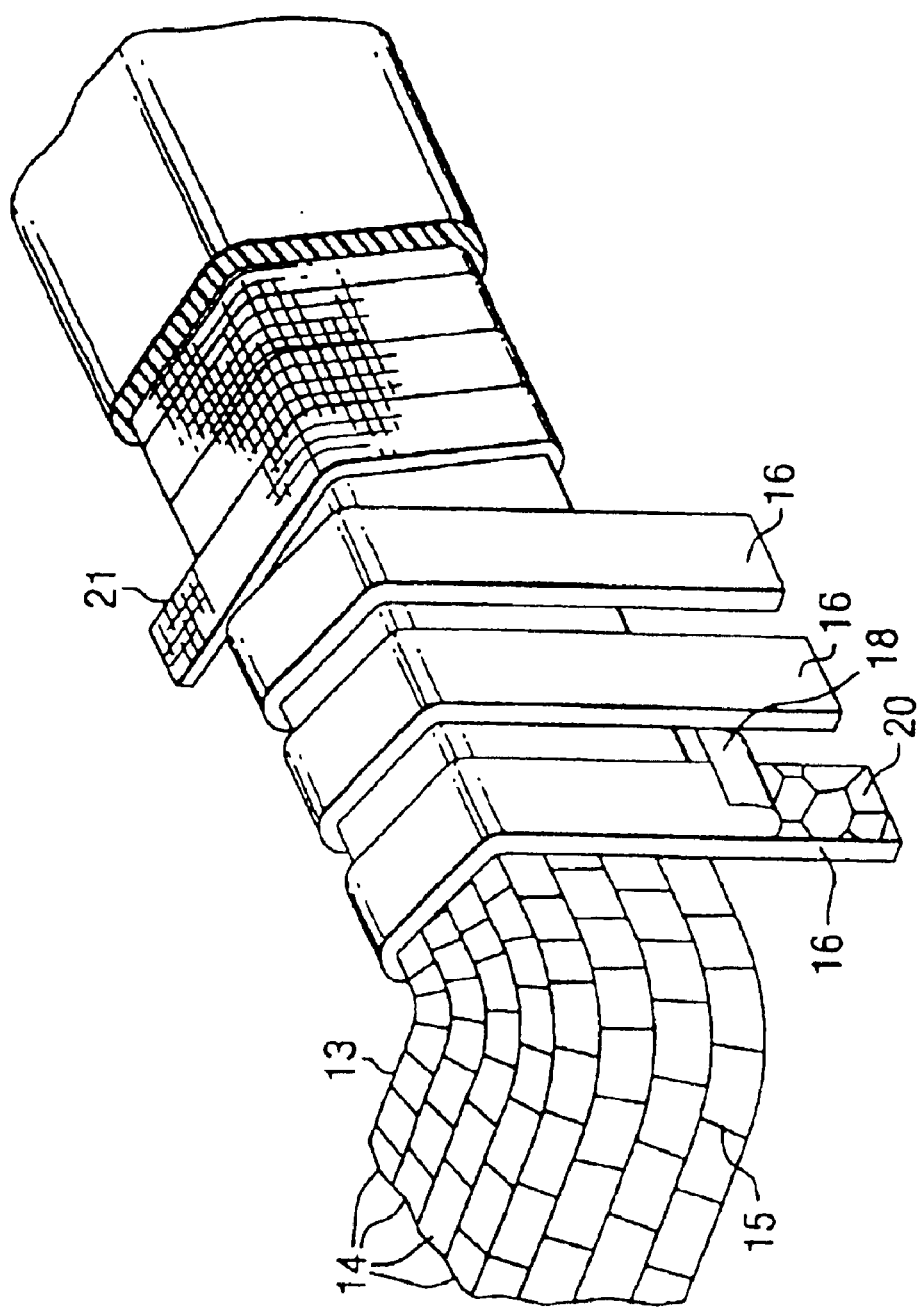
FIG. 1 illustrates a typical mica tape used to insulate an electrical conductor.
Figure 2:
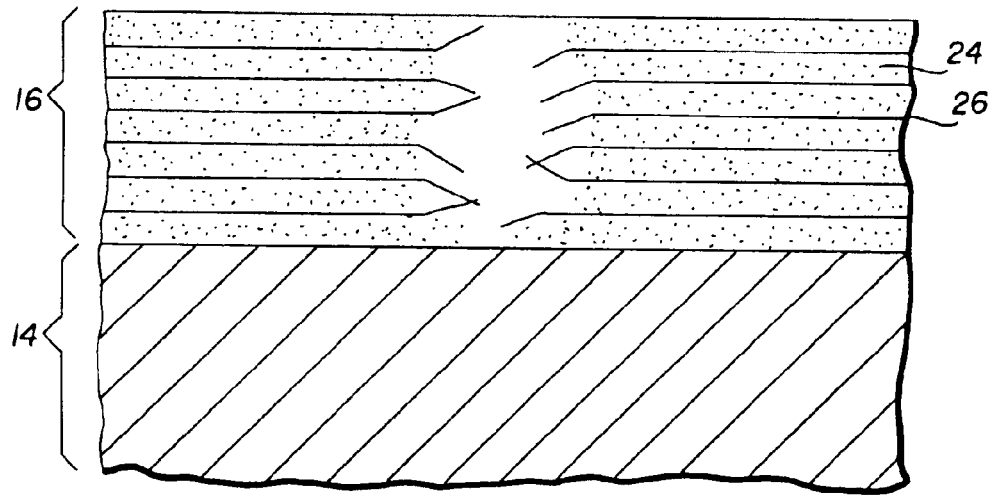
FIG. 2 illustrates simplified cross-sectional close up of a damaged portion of a mica tape.
Figure 3:
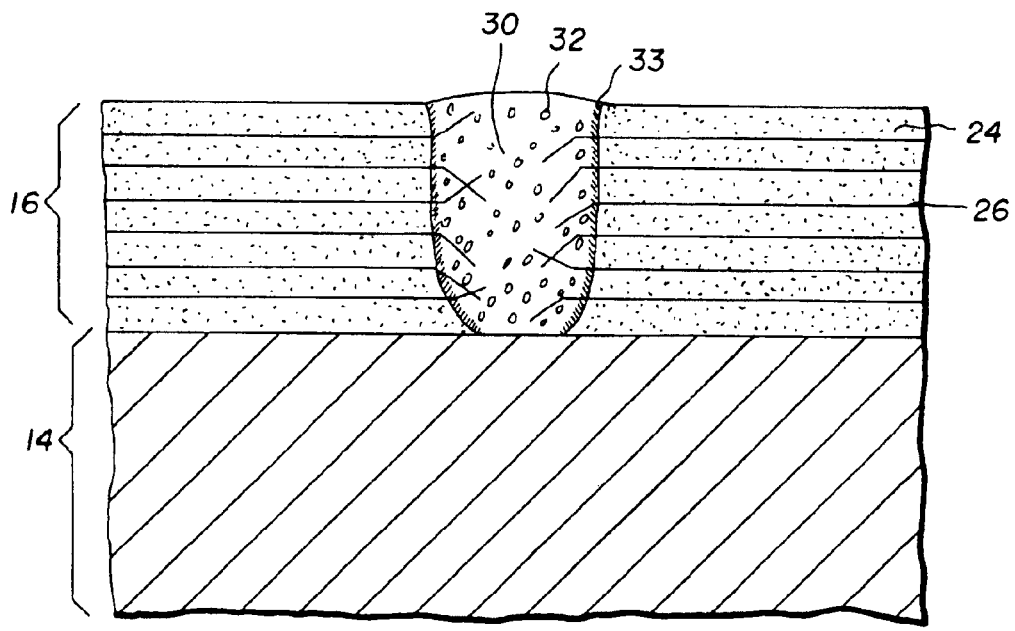
FIG. 3 illustrates the patching resin of the prior art.

The present invention provides for a patching resin that contains metal intercalated AlSiO nano structures, such as nanoclays. As discussed above, when mica tapes become damaged, the only solutions currently available are to patch the damage with a patching resin that leaves areas weak dielectric strength, or to completely replace the entire length of mica-tape. The present invention allows for a patching resin in which metal intercalated nanoclays permeate the mica layers of the damaged mica tape, thereby creating a patch with strong dielectric strength that is not susceptible to discharge and the resulting material breakdown of the prior art.

Mica, as used in insulating tape, is present as mica flakes, which are usually muscovite, $KAl_2AlSi_3O_{10}(OH)_2$, or phlogopite, $KMg_3AlSi_3O_{10}(OH)_2$, or mixtures of the two. Mica is unique amongst materials in having a high resistance to partial discharges thereby increasing the voltage endurance and prolonging the life of insulation materials. High energy electrons resulting from partial discharges (sometimes referred to as electron avalanches) are slowed down and de-energized by the strong positive fields generated by the arrays of $K^+$ ions held within the silicate lattice of the mica. Therefore patching resins have used mica particles suspended in a resin similar to that used to initially impregnated the mica tapes. As discussed above, this leads to interfaces between the damaged areas and the patch where electrical discharges occurs.

Though mica tapes are the industry standard, there has been movement in the direction of replacing them with lighter and thinner electrical insulators. U.S. Pat. No. 6,238, 790, which is incorporated herein by reference, provides a low cost, high voltage electrical insulation that can replace impregnated mica flakes or mica tape which can be applied in thin cross-sections while still providing high voltage protection and having high voltage endurance. In the '790 patent, an electrically conducting member is insulated with a coating of a resin interactive with, and bonded to an oligomer that contains a metal selected from the group consisting of Cr, Sn, Zn and mixtures thereof. The oligomer is disposed within an AlSiO containing structure, where the structure constitutes from about 3–25% by weight (wt) of the patching resin weight.

The present invention uses a similar resin to the '790 patent to patch dents and repair damage to mica tape. The resin of the present invention, however, is a better-wetting agent, has a higher-adhesive strength, has a more homogeneous consistency, is less viscous and will cure at a lower temperature than the previously used resins. Also, unlike the resins with mica particles, the patching resin of the present invention will not create an interface between the resin patch and the damaged mica tape as the intercalated nanoclays will penetrate the mica layers. A homogeneous patch will be created that will reduce or eliminate electrical discharge since there will be no interface between the damaged area and the mica tape.

Figure 4:
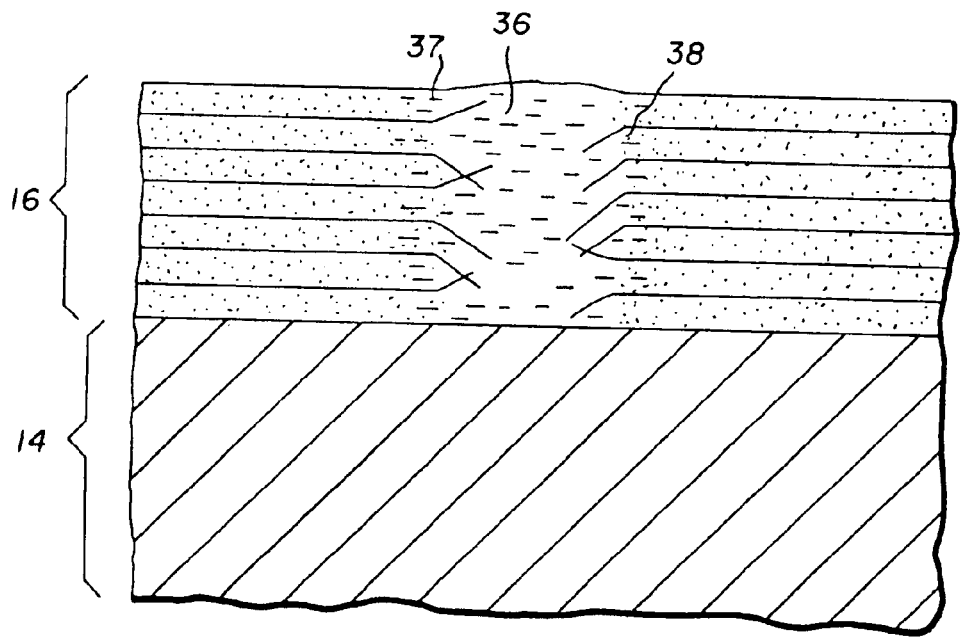
FIG. 4 illustrates the patching resin of the present invention.
Figure 5:
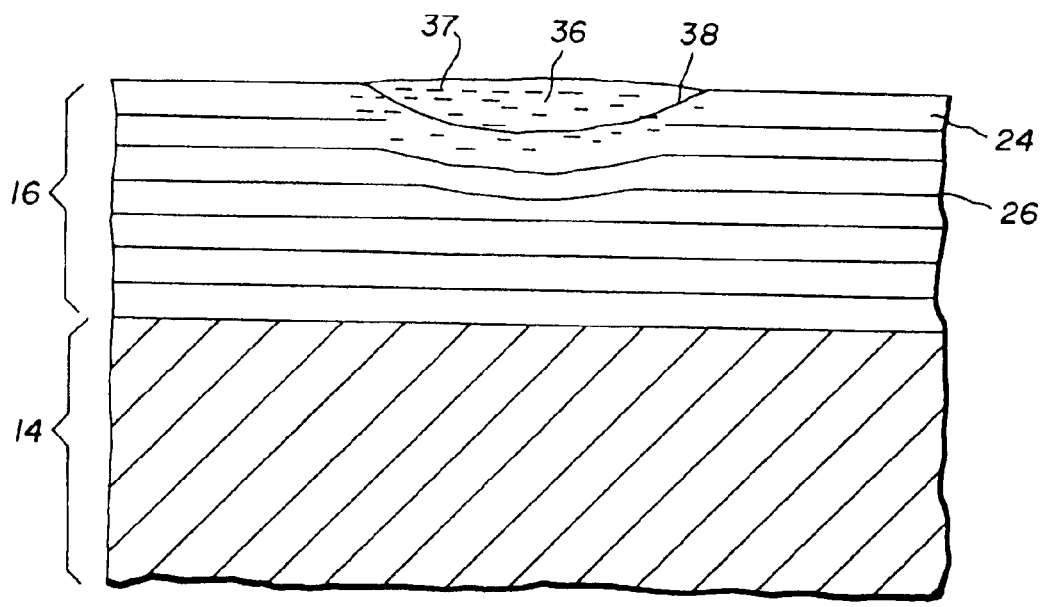
FIG. 5 illustrates the patching resin being used to thicken an area of insulating tape.

FIG. 4 illustrates an example of the patching resin of the present invention. A mica tape 16 insulating an electrical conductor 14 is filled with a patching resin of the present invention 36. The metal intercalated AlSiO nano structures 37 in the patching resin penetrates into the mica layers 24, whereby the edge of the damaged area 38 does not create an interface where electrical discharge may occur. The patching resin of the present invention is also useful for repairing dents or thickening thin areas in mica tape. Unlike straight tears in the mica tapes, dents and thin areas create a more insidious type of damage in that they reduce the dielectric strength of the mica tape by reducing its thickness. The patching resin of the present invention may be applied to a dented area to restore dielectric strength to a dented area. FIG. 5 illustrates and example the patching resin 36 being used to thicken an area of insulating tape 16. The patching resin penetrates the insulating tape, creating a homogenous transition 38 between the patch and the insulating tape.

In one embodiment, the present invention comprises an unreacted low molecular weight epoxy patching resin oligomer (patching resin) containing metal intercalated AlSiO nano structures. Unintercalated nanoclays are readily available from Nanocore and Southern Clay Products. The metal intercalation modification may be carried out as described in U.S. Pat. No. 6,238,790, which is incorporated herein by reference. The AlSiO structures are typically nanoclays, and the preferred metals are Cr, Sn and Zn, and mixtures thereof. The patching resin is applied to damaged mica tapes, where the metal intercalated nanoclays penetrate the damaged area. This is then cured by localized heating at low temperatures, leaving a homogenous patch.

The intercalation of a AlSiO nano structure, such as a nanoclay, may be done using a variety of metals. In a particular embodiment, however, transition metals are used. The choice of transition metal salt can be guided by considering the charge/size ratio. Typically the transition metal ions have higher charge and smaller size, thus having a much higher charge/size ratio. As discussed above, the insulating properties of mica are largely due to the $K^+$ ions held in the silicate lattice. My using metal ions with a higher charge/size ration, this will give insulation the patching resin an effective partial discharge protection, and hence longer voltage endurance, than is found with mica. This is because the higher charge/size ratio of these metal ions will give efficient de-energizing of the fast electrons that are responsible for damaging insulation materials. Examples include but are not limited to K, Cr, Sn, Zn Li, Mg, Mn, Fe and Co. In particular, Cr, Sn or Zn cations will give insulation materials with even more effective partial discharge protection and hence longer voltage endurance.

The metals are first reacted with oligomers before being intercalting the AlSiO. Useful oligomers which may be utilized to contain the metals, such as Cr, Sn or Zn and their mixtures, can be of a dimer structure. These oligomers can also be in other well known structures, for example a trimer, open tetramer, and closed tetramer structures. Usually, an oligomer is prepared containing the metal. This can be accomplished, generally, by the reaction of a strong acid, such as perchloric acid, with a metal salt in aqueous solution, such as chromium nitrate, tin chloride dihydrate or zinc nitrate hydrate. Other particular oligomers are metal 2,4-pentanedionates, such as Cr (III) 2,4-pentandionate, which can be readily applied to nanoclay structures using non-aqueous organic solvents, such as methyl ethyl ketone (MEK) or ethyl alcohol. As will be discussed, the solvents are substantially removed from the reactants prior to the formulation of the patching resin.

A solid AlSiO based material has a platelet form that has spaces between the constituent platelets, which are capable of being expanded. In one embodiment an unmodified mica-type silicate may be used. For example, unmodified muscovite mica, phlogopite mica or clay type silicates such as montmorillonite, or their mixtures, can be treated to expand or further open spacing between constituent platelets so that oligomers and organic resin molecules can intercalate into the mica or clay platelets. As a usual pre-step, these mica or clay platelets can be chemically treated by contact with amines, onium salts, such as ammonium salts, or other chemicals added in amounts effective to expand the interlayer distance of the mica or clay and help to make those materials less hydrophilic and more hydrophobic so that the generally hydrophobic polymer materials can more easily interact with the mica or clay. In particular nanoclays are used, such as muscovite $KAl_2AlSi_3O_{10}(OH)_2$, phlogopite $KMg_3AlSi_3O_{10}(OH)_2$ or montmorillonite $Al_2O_3 4SiO_2 H_2O$.

At least one metal containing oligomer is inserted or disposed within, that is, intercalated into opened AlSiO based material. This is carried out, in one method, by dissolving the metal containing oligomer in a suitable solvent, for example a ketone Chromium(III) 2,4-pentanedionate and then contacting the AlSiO based material with the solution for an effective time, followed by drying.

Though solvents are often necessary in the formation of the metal intercalated AlSiO structures, it is important that the solvent not be present in the final patching resin. Solvent in the patching resin can further damage the mica tape that is attempting to be repaired. Therefore, substantially all solvents need to be removed from the metal intercalated AlSiO structures prior to being mixed with the resin.

The metal containing oligomer, now disposed in the opened AlSiO material is then interacted with a suitable resinous composition which can polymerize with itself and also with the metal containing oligomer disposed within the AlSiO material. The intercalated mica, clay or the like, is mixed with a suitable resinous composition. The ratio of oligomer-metal containing AlSiO to resin is from about 3 wt % to 25 wt %, preferably 5 wt % to 10 wt %. Upon heating, the resinous composition will chain link to form polymers around and within the AlSiO material.

The presence of intercalated metals has the further benefit of providing for additional catalytic cure of the epoxy resins to give improved electrical, mechanical, tensile and thermal capability. Unlike previously used resins, the resin of the present invention cures at much lower temperatures, though high temperatures can also be used. Localized heating, such as heat lamps may be used to cure the resin. Optimal ranges are from 60–120° C., with 90° C. being a standard temperature.

The voltage endurance of the cured patching resin is greater than 1000 hours at 188 volts/mil (7.5 kv/mm), and generally within the much higher range of 2800–3000 hours at 188 volts/mil.

One type of resinous composition that can be used is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl polyethers, providing a diglycidyl ether of bisphenol A type epoxide or a diglycidyl ether of bisphenol F type epoxide. The bisphenol epoxides have a 1,2-epoxy equivalency greater than one and will generally be diepoxides.

Other glycidylether resins that are useful in this invention include polyglycidyl ethers of a novolac prepared by reacting an epihalohydrin with an aldehyde, for example a phenol formaldehyde condensate. Cycloalyphatic type epoxides are also useful, as are glycidyl ester epoxy resins, both being non-glycidyl ether epoxides, all of which are well known in the art and described in detail by Smith et al, in U.S. Pat. No. 4,254,351, where epoxidized polybutadiene, also useful in this invention, is described. These resinous compositions are referred to as polyepoxide resins. Also useful are epoxy resins based on Liquid Crystal Thermoset (LCT) structures. The LCT resin would be particularly useful if it can effectively be reduced to a lower viscosity.

Other useful resins include polyesters, and 1–2, polybutadienes, all of which are well known in the art. Generally, polyester resins are a large group of synthetic resins, almost all produced by reaction of dibasic acids with dihydric alcohols. In a few cases trifunctional monomers such as glycerol or citric acid are used. The term polyester resin applies especially to the products made from unsaturated dibasic acids such as maleic acid. Unsaturated polyester resins can be further polymerized through cross linking. Often, another unsaturated monomer such as styrene is added during this second stage of the polymerization, which can occur at ordinary temperatures with suitable peroxide catalysts. Maleic anhydride and fumaric acid are the usual unsaturated acid components, while phthalic anhydride, or adipic or azelaic acid are the corresponding saturated materials. Commonly used glycols include ethylene, propylene, diethylene, dipropylene, and certain butylene glycols. The added polymerizable monomer includes styrene, vinyltoluene, diallyl phthalate or methyl methacrylate. In addition to the unsaturated polyester resins, there are other important types. One large group are the alkyd resins. These are made from saturated acid and alcohol monomers with many types of modifications, usually the inclusion of an unsaturated fatty acid.

Particular brand epoxy resins used are bisphenol A and bisphenol F resins readily commercially available from Dow Chemical Co. The bisphenol F is more fluid and therefore may penetrate the damaged areas more readily in many circumstances. Though the patching resin of the present invention may have a great range of viscosities depending on use, in a preferred embodiment, the viscosity is 100–300 centipoise (cps), with a particular viscosity of 120–175 cps.

In obtaining the proper viscosity, a reactive diluent is often added to the patching resin. This may be added to the resin prior to the addition of the metal intercalated AlSiO structures, thereby aiding the mixing of the two. The addition of reactive diluent aids in the wetting properties of the patching resin, thereby improving the uniformity and penetration of the patch. Reactive diluents are known in the art, however particular types include the diglycidylether of neopentyl glycol (DGENPG) and the diglycidylether of 1,4,butane diol (DGEBD). When the reactive diluent is used, the ratios of the metal intercalated AlSiO nano structures to resin mention above include the weight of the reactive diluent in the resin.

In one embodiment, the present invention provides a method for repairing a damaged area in a mica insulation material. The method involves formulating a patching resin that has improved wetting properties over patching resins of the prior art. The patching resin comprises a resinous composition, metal intercalated AlSiO nano structures, and a reactive diluent. The ratio of the metal intercalated AlSiO nano structures to the resinous composition and the reactive diluent is between 3–35% wt. The patching resin is then applied to the damaged area and cured to produce a patch. The viscosity of the patching resin is between 100–300 cps, and may be between 120–175 cps. The metal intercalated AlSiO nano structures penetrates the damaged area of the mica insulation material creating a homogenous transition between the damaged area and the patch.

In one embodiment the ratio of the metal intercalated AlSiO nano structures to the resinous composition and the reactive diluent is between 5–10% wt.

In another embodiment, the curing of the patching resin is performed locally on the damaged area. The temperatures used in curing may range from about 60–120° C., and in particular are approximately 90° C.

In a particular embodiment the metal in the metal intercalated AlSiO nano structures is one of Cr, Sn, Zn and mixtures thereof.

In another particular embodiment the AlSiO nano structures in the metal intercalated AlSiO nano structures are nanoclays.

In still another particular embodiment the resinous composition is bisphenol F.

In one embodiment the reactive diluent is at least one of DGENPG, DGEBD and mixtures thereof.

In another embodiment the metal intercalated AlSiO nano structures are substantially free of solvent when formulating said patching resin.

In another embodiment the present invention provides for a method of thickening an insulating tape. The method involves formulating a patching resin that has improved wetting properties over patching resins of the prior art. The patching resin comprises a resinous composition, metal intercalated AlSiO nano structures, and a reactive diluent. The ratio of the metal intercalated AlSiO nano structures to the resinous composition and the reactive diluent is between 3–35% wt. The patching resin is then applied to the insulating tape and cured to produce a patch. The viscosity of the patching resin is between 100–300 cps, and may be between 120–175 cps. The metal intercalated AlSiO nano structures penetrates the insulating tape creating a homogenous transition between the damaged area and the patch.

In a non-limiting example, the a patching resin of the present invention may be prepared as follows:

50 g of a Bisphenol "F" epoxy resin [Epon DPL-862 from Shell Chemical Co.] was blended at room temperature with 50 g of DGENPG epoxy reactive diluent [Heloxy 68 also from Shell Chemical Co.] and 100 g of 1-Methyltetrahydro phthalic anhydride [MTHPA-EG from Lonza Chemicals] in a small glass beaker. 0.1 g of Chromium Acetylacetonate was added to this solution as cure accelerator and stirring was continued until the solution was clear. 7.5 g of Nanoclay powder, intercalated with Di-n-butylbis(2,4-pentanedionate) Tin, was then added to this solution and stirring was continued until the solution became clear. This patching compound was evaluated on a damaged insulation test bar by applying it to the damaged groundwall areas and curing for 8 hours at 90° C. and than for 8 hours at 150° C. The cured samples were then cycled four times up to 155° C. from room temperature. No delamination or loss of adhesion to the damaged mica surface was shown after these thermal aging conditions thereby verifying the integrity of the patching composition.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method for repairing a damaged area in an insulation material comprising:
   formulating a patching resin comprising a resinous composition, metal intercalated AlSiO nano structures, and a reactive diluent, wherein the ratio of said metal intercalated AlSiO nano structures to said resinous composition and said reactive diluent is between 3–35% wt;
   applying said patching resin to said damaged area; and
   curing said patching resin to produce a patch;
   wherein said patching resin has a voltage endurance of at least 1000 hours at 188 volts/mil (7.5 kv/mm);
   wherein the viscosity of said patching resin is between 100–300 cps; and
   wherein said metal intercalated AlSiO nano structures penetrate said damaged area of said mica insulation material creating a substantially homogenous transition between said damaged area and said patch.

2. The method of claim 1, wherein the ratio of said metal intercalated AlSiO nano structures to said resinous composition and said reactive diluent is between 5–10% wt.

3. The method of claim 1, wherein the curing of said patching resin is performed locally on said damaged area.

4. The method of claim 1, wherein the temperature of the curing of said patching resins is between about 60–120° C.

5. The method of claim 1, wherein the temperature of the curing of said patching resins is approximately 90° C.

6. The method of claim 1, wherein the metal in said metal intercalated AlSiO nano structures is one of Cr, Sn, Zn and mixtures thereof.

7. The method of claim 1, wherein the AlSiO nano structures in said metal intercalated AlSiO nano structures are nanoclays.

8. The method of claim 1, wherein said resinous composition is bisphenol F.

9. The method of claim 1, wherein said reactive diluent is at least one of DGENPG, DGEBD and mixtures thereof.

10. The method of claim 1, wherein the viscosity of said patching resin is between 120–175 cps.

11. The method of claim 1, wherein said patching resin has a voltage endurance of 2800 to 3000 hours at 188 volts/mil (7.5 kv/mm).

12. A method for repairing a damaged area in a mica insulation material comprising:
   formulating a patching resin comprising a resinous composition, metal intercalated AlSiO nano structures, and a reactive diluent, wherein the ratio of said metal intercalated AlSiO nano structures to said resinous composition and said reactive diluent is between 3–35% wt;
   applying said patching resin to said damaged area; and
   curing said parching resin with a localized heat on said damaged area of between 60–120° C.;
   wherein said patching resin has a voltage endurance of at least 1000 hours at 188 volts/mil (7.5 kv/mm);

wherein said metal intercalated AlSiO nano structures are substantially free of solvent when formulating said patching resin;

wherein the viscosity of said patching resin is between 100–300 cps;

wherein said metal intercalated AlSiO nano structures penetrate said damaged area of said mica insulation material creating a substantially homogenous transition between said damaged area and said patch;

wherein the metal in said metal intercalated AlSiO nano structures is one of Cr, So, Zn and mixtures thereof.

13. A method of thickening an insulating tape comprising formulating a patching resin comprising a resinous composition, metal intercalated AlSiO nano structures, and a reactive diluent, wherein the ratio of said metal intercalated AlSiO nano structures to said resinous composition and said reactive diluent is between 3–35% wt;

applying said patching resin to said insulating tape;

wherein said patching resin has a voltage endurance of at least 1000 hours at 188 volts/mil (7.5 kv/mm);

wherein the viscosity of said patching resin is between 100–300 cps;

wherein said metal intercalated AlSiO nano structures penetrate said insulating tape creating a substantially homogenous transition between said insulating tape and said patching resin; and curing said patching resin to produce a thicker insulating tape.

14. The method of claim 13, wherein the ratio of said metal intercalated AlSiO nano structures to said resinous composition and said reactive diluent is between 5–10% wt.

15. The method of claim 13, wherein the curing of said patching resin is performed locally on said damaged area.

16. The method of claim 13, wherein the temperature of the curing of said patching resins is between about 60–120° C.

17. The method of claim 13, wherein the metal in said metal intercalated AlSiO nano structures one of Cr, Sn, Zn and mixtures thereof.

18. The method of claim 13, wherein the AlSiO nano structures in said metal intercalated AlSiO nano structures are nanoclays.

19. The method of claim 13, wherein said resinous composition is bisphenol F.

20. The method of claim 13, wherein said reactive diluent is at least one of DGENPG, DGEBD and mixtures thereof.

21. The method of claim 13, wherein the viscosity of said patching resin is between 120–175 cps.

22. The method of claim 13, wherein said metal intercalated AlSiO nano structures are substantially free of solvent when formulating said patching resin.

23. The method of claim 13, wherein said patching resin has a voltage endurance of 2800 to 3000 hours at 188 volts/mil (7.5 ky/mm).

* * * * *